United States Patent [19]

Nire et al.

[11] Patent Number: 5,006,365
[45] Date of Patent: Apr. 9, 1991

[54] METHOD OF MANUFACTURING A THIN FILM EL DEVICE BY MULTISOURCE DEPOSITION METHOD

[75] Inventors: Takashi Nire, Hiratsuka; Takehito Watanabe, Isehara, both of Japan

[73] Assignee: Kabushiki Kaisha Komatsu Seisakusho, Tokyo, Japan

[21] Appl. No.: 269,930

[22] Filed: Oct. 28, 1988

Related U.S. Application Data

[62] Division of Ser. No. 947,782, Dec. 30, 1986, Pat. No. 4,794,302.

[30] Foreign Application Priority Data

Jan. 8, 1986 [JP] Japan ................................. 61-1883
Jan. 24, 1986 [JP] Japan ................................ 61-13472

[51] Int. Cl.$^5$ ........................... B05D 5/12; H01J 1/62; H01J 63/04
[52] U.S. Cl. ................................. 427/66; 427/255.2; 427/255.7; 427/255; 427/419.1; 427/419.2; 427/419.7; 313/509; 313/498
[58] Field of Search ................... 427/66, 255.2, 255.7, 427/255, 419.1, 419.2, 419.7; 313/509, 498, 113

[56] References Cited

U.S. PATENT DOCUMENTS

| | | | |
|---|---|---|---|
| 4,416,933 | 11/1983 | Antson et al. | 427/66 |
| 4,418,118 | 11/1983 | Lindors | 427/66 |
| 4,455,506 | 6/1984 | Ayyagari et al. | 427/66 |
| 4,617,195 | 10/1986 | Mental | 427/66 |
| 4,672,266 | 6/1987 | Taniguchi et al. | 313/509 |
| 4,686,110 | 8/1987 | Endo et al. | 427/66 |
| 4,693,906 | 9/1987 | Lindmayer | 427/66 |
| 4,775,549 | 10/1988 | Ota et al. | 427/66 |

FOREIGN PATENT DOCUMENTS

| | | | |
|---|---|---|---|
| 52-10358 | 3/1977 | Japan . | |
| 54-8080 | 4/1979 | Japan . | |
| 56-162496 | 12/1981 | Japan | 427/66 |
| 58-55635 | 12/1983 | Japan . | |
| 129254 | 10/1972 | United Kingdom | 427/66 |

*Primary Examiner*—Norman Morgenstern
*Assistant Examiner*—Margaret Bueker
*Attorney, Agent, or Firm*—Varndell Legal Group

[57] ABSTRACT

The disclosure describes a thin film EL device including a luminescent layer made of column polycrystals formed by independently evaporating luminescent host material and an activator and then combining the evaporated substances on a substrate. Electrons in the luminescent layer which are accelerated by an electric field applied from the outside efficiently collide against the activator without being intercepted by interfaces between crystalline particles. The thin film EL device of the present invention can be used for display, illumination, writing, reading out, and erasure of signals of photo-recording mediums.

4 Claims, 6 Drawing Sheets

ZnS+Mn(0.1~1%)

METHOD OF MANUFACTURING A THIN FILM EL DEVICE BY MULTISOURCE DEPOSITION METHOD

This is a divisional application of application Ser. No. 947,782, filed Dec. 30, 1986, now U.S. Pat. No. 4,794,302.

BACKGROUND OF THE INVENTION

1. Field of the Invention

This invention relates to a thin film electroluminescent (EL) element and more particularly an improved high brightness low voltage drive thin film EL device, and a method of manufacturing the same.

2. Description of the Prior Art

A prior art dispersion type EL device using a powder of zinc sulfide (ZnS) type fluorescent substance could not be used as a light source of illumination because of its low brightness. In recent years, a thin film type EL device utilizing a thin film of fluorescent substance has become noted because of the high brightness.

The thin film EL device is now widely used for vehicles, display apparatus of a computer terminal element or the like and a source of illumination because the thin film EL device comprises a light emitting layer made of a transparent film which prevents dispersion of light incident from outside or emitted by an internal luminescent layer thereby decreasing halation and blur and providing clear display of high contrast.

For example, a thin film EL device utilizing Mn as a activator in ZnS has a dual dielectric structure wherein a transparent electrode made of a tin oxide layer ($SnO_2$), a first insulating layer, a crystalline film utilizing ZnS as a host material and Mn acting as an activator, that is an ZnS:Mn luminescent layer, a second insulating layer and a back electrode made of aluminum or the like are sequentially laminated on a transparent substrate.

Light is emitted as follows. When voltage is impressed across the transparent electrode and the back electrode, electrons that have been trapped at an interface level by electric field induced in the luminescent layer are released and imparted with energy sufficient to accelerate the electrons so that these electrons collide against the orbit electrons of Mn (luminescent center) so as to excite the orbit electrons. Light is emitted when the excited activator returns to the base state.

As disclosed in Japanese Published Patent Specification Nos. 10358/1978 and 8080/1979, the electron beam vapor deposition method has been used for forming such luminescent layer as ZnS:Mn of the thin film EL device.

Such thin film EL device has been formed in a vacuum chamber 1 by irradiating a pellet 2 formed by sintering a mixture of ZnS and 0.1-1 at. % of Mn with an electron beam 4 emitted by an electron gun 3 as shown in FIG. 10, so as to heat and vaporize the pellet and cause the vaporized pellet to deposit on a substrate 5.

With this method, however, since the vapor pressure of the host material comprising the luminescent layer, the vapor pressure of an element comprising the host material, and the vapor pressure of the activator (for example PZnS, PZn PS, PMn) differ greatly (PZnS<PMn<PZn<PS) there are such problems that the host material of the laminated luminescent layer deviates from stoichiometric composition, thus degrading crystalline structure and making nonuniform the distribution of the activator due to nonuniform evaporation and reevaporation of elements once deposited on the substrate. In the foregoing description PZnS, PMn, PZn and PS respectively represent vapor pressures of ZnS, Mn, Zn and S.

Consequently, as shown in FIG. 11, the luminescent layer formed by the electron beam vapor deposition method has a particulate polycrystalline structure or at the initial stage of growth many small crystal particles are formed, that is a structure in which so called dead layers present.

In a thin film EL device utilizing such luminescent layer, electrons E in the luminescent layer accelerated by electric field applied from outside collide against the activator Im with the result that the electrons will be dispersed at the interfaces B of the crystal particles before the electrons contribute to luminescence. Thus, the electric field applied from outside does not efficiently contribute to luminescence.

Efficient deriving out of light emitted by the luminescent layer is important for increasing the luminescent efficiency. For efficiently deriving out the light from the luminescent layer, a method of controlling the refractive index and the film thickness of the first insulating layer has been proposed as, for example, in Japanese Published Patent Specification No. 55635 of 1983.

The equivalent circuit of such thin film EL device can be represented by three serially connected capacitors (see FIG. 4) constituted by a first insulating layer 21, a luminescent layer 24 and a second insulating layer 25. When the specific dielectric constants $\epsilon r1$ and $\epsilon r2$ of the first and second dielectric layers are sufficiently larger than the specific dielectric constant $\epsilon l$ of the luminescent layer that is $\epsilon r1$, $\epsilon r2 >> \epsilon l$, thin capacitances Cr1, Cr2, and Cl are expressed by a relation Cr1, Cr2>>Cl so that almost all portions of the voltage impressed across the element from outside will be applied across the luminescent layer with the result that it is impossible to obtain a high brightness with a low driving voltage.

For decreasing the driving voltage, it is advantageous to construct the first insulating layer with a material having a large dielectric constant. However, where a material having a large dielectric constant is used, the reflection at the interface between the first insulating layer and the transparent electrode becomes large, thus failing to efficiently deriving out light from the luminescent layer.

For this reason, in order to obtain a practical brightness of about 20 ft-L, it is necessary to apply a high voltage of the order of 200 V to the thin EL device.

SUMMARY OF THE INVENTION

Accordingly, it is an object of this invention to provide a novel thin film EL device capable of generating a high brightness and can be driven with low voltage, and a method of manufacturing such thin film EL device.

According to one aspect of this invention, there is provided a thin film EL device comprising a transparent electrode, a insulating layer, a luminescent layer and a back electrode, the luminescent layer being constituted by column polycrystals.

According to another aspect of this invention, there is provided a method of manufacturing a thin film EL device including a lamination of a substrate, a transparent electrode, a insulating layer, a luminescent layer, and a back electrode comprising the steps of evaporating host material of the luminescent layer or an element of the host material, and an activator of the luminescent layer from a plurality of discrete evaporating sources, and depositing evaporated host material, or element thereof and evaporated activator or an element thereof so as to be combined on the substrate.

DESCRIPTION OF THE PREFERRED EMBODIMENT

Briefly stated, according to this invention a column polycrystalline film is used for luminescent layer of a thin film EL device. Further, the host material of the luminescent layer of the elements constituting the base material and an activator are evaporated from independent sources and the evaporated substances are then combined on the substrate.

Figure 1:
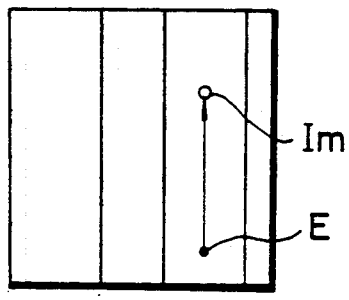
FIG. 1 shows the crystalline structure of the luminescent layer of a thin film EL device embodying the invention.

Thus as shown in FIG. 1, where column polycrystals are used as the luminescent layer, the electron E in the luminescent layer are accelerated by the electric field applied from outside and collide against the activator Im, thereby enabling efficient luminescence.

Figure 2:
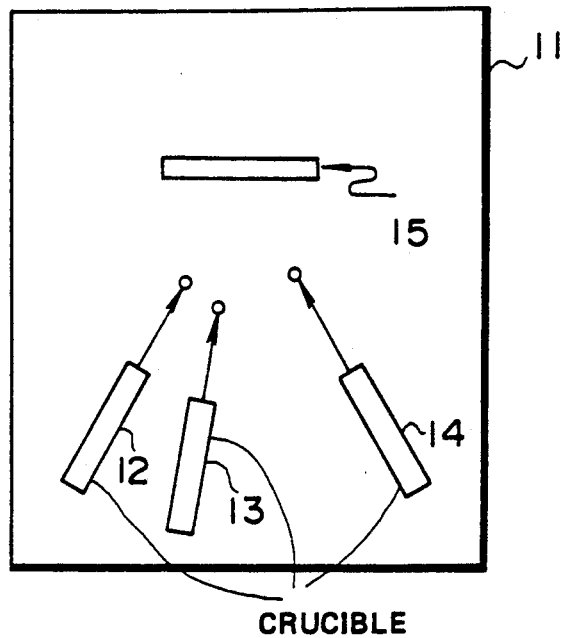
FIG. 2 is a diagram showing the principle of the method of forming the luminescent layer according to this invention.

Referring to FIG. 2, to form the luminescent layer, constituting elements of host material and activator, for example, Mn, S and Zn are put in separate crucibles 12, 13 and 14 in a vacuum chamber 11 which is maintained at a vacuum of $10^{-3}$-$10^{-7}$ torr temperature of the crucibles are independently controlled so that their temperatures are controlled such that the luminescent layer will have a stoichiometric composition. Thus, column crystals having a uniform distribution of the activator can be deposited on a substrate 15 according to the following steps.

Suppose now that substances A and B are formed on a substrate by multisource vapor deposition process in which independent evaporation sources comprising independent crucibles respectively containing substances A and B are used.

Let us denote the vapor pressure of the substance A at a given temperature TA by PA. Then, when the degree of vacuum PO (pressure) in the vacuum chamber is PO<PA, by selecting TS in a relation TS>TA such that the substrate temperature TA will satisfy a relation PAS>PA where PAS represents the vapor pressure of substance A at a substrate temperature TS so that even if the substance A is evaporated, it is not deposited on the substrate.

On the other hand, when the vapor pressure PABS of a compound of AB at a temperature TS of substances A and B is selected such that PABS<PO, where substance B presents on the substrate (PBS<PO), the substances A and B react with each other on the substrate whereby crystals of a compound AB grows. At this time, when element B (or A) presenting on the substrate combines with arriving element A (or B), the elements are deposited at a position having lowest potential with the result that only the crystalline surfaces grow thereby forming column crystals.

Where the activator is constituted by a compound, more efficient luminescent layer can be formed by evaporating repective elements of the compound in independent crucibles and then independently controlling the quantity of evaporation of respective elements.

For example, respective constituting elements Zn and S of ZnS utilized as the host material of the luminescent layer, and constituting elements Tb and F of the activator $TbF_3$ are put in independent crucibles (Zn, S, Tb, $TbF_3$). When the temperature of the crucibles are independently controlled so as to control evaporation quantities such that the resultant luminescent layer will have a stoichiometric structure, it is possible to deposit on the substrate column crystals having a uniform distribution of the activator.

In a thin film EL device formed by sequentially laminating a transparent electrode, a first insulating layer, a luminescent layer, a second insulating layer and a back electrode on a substrate according to this invention, a third dielectric layer may be interposed between the transparent electrode and the first insulating layer, the third insulating layer having a refractive index intermediate of the indices of the transparent electrode and of the first insulating layer.

With this construction, it is possible to decrease the reflection of light at the interface between the first insulating layer and the transparent electrode without decreasing the dielectric constant of the first insulating layer. As a consequence, it is possible to decrease reflection thereby enabling to efficiently deriving out light from the luminescent layer.

For example, by denoting the refractive index of the transparent electrode by $n_0=2$, that of the first insulating layer by $n_2=1$ and where a third insulating layer having a refractive index $n_1=1.5$ is interposed between the transparent electrode and the first insulating layer, the reflective index $R_1$ between the transparent electrode and the third insulating layer is expressed as follows according to present law.

$$R_1 = \left(\frac{n_0 - n_1}{n_0 + n_1}\right)^2 = 2\%$$

The reflection index between the third insulating layer and the first insulating layer is expressed by $$R_2 = \left(\frac{n_1 - n_2}{n_1 + n_2}\right)^2 = 4\%$$

Consequently the total refractive index becomes 6% so that the transmission efficiency becomes 94%.

In contrast, in the absence of the third insulating layer the refractive index between the transparent electrode and the first insulating layer is expressed by $$R_3 = \left(\frac{n_0 - n_2}{n_0 + n_2}\right)^2 = 11\%$$

and the transmission efficiency becomes 89%.

Comparison of these transmission efficiencies shows that the transmission efficiency can be greatly improved by the addition of the third dielectric layer.

Figure 3:
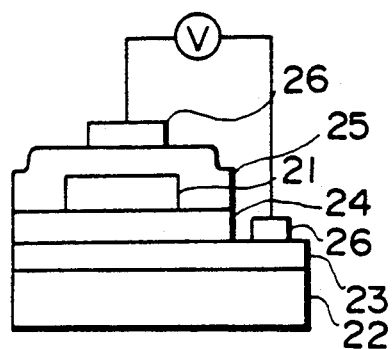
FIG. 3 is a side view showing one embodiment of the thin film EL device according to this invention.
Figure 3:
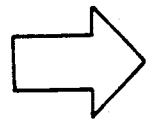

The embodiment shown in FIG. 3 has a laminated construction wherein a luminescent layer 21 is made of a thin layer of a thickness of 5000 Å of column polycrystalline structure made of host material ZnS containing 0.4 at. % Mn acting as the activator (hereinafter merely termed ZnS: 0.4 at. % Mn).

More particularly, on a transparent glass substrate 22 having a thickness of 1 micron are sequentially laminated a transparent electrode 23 having a thickness of 0.3 micron and made of tin oxide ($SnO_2$) or the like, a first insulating layer 24 having a thickness of 0.5 micron and made of tantalum oxide ($Ta_2O_5$), the luminescent layer 21, a second insulating layer 25 having a thickness of 0.5 micron and made of $Ta_2O_5$ and a back electrode 26 made of an aluminum film having a thickness of 0.5 micron.

Figure 4:
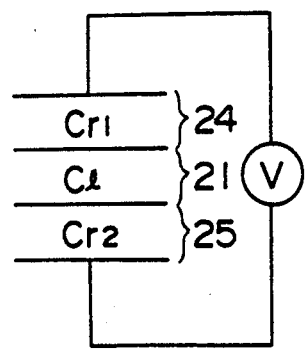
FIG. 4 shows an equivalent circuit of the element shown in FIG. 3.

As shown in FIG. 4, the equivalent circuit of this thin film EL device can be shown by three serially connected capacitors respectively constituted by the first insulating layer 24, the luminescent layer 21 and the second insulating layer 25.

A method of manufacturing the thin film EL device will now be described as follows.

Figure 5A:
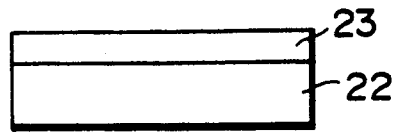
FIGS. 5a through 5e are side views showing successive steps of manufacturing the element shown in FIG. 3.

As shown in FIG. 5A, a transparent electrode 23 consisting of $SnO_2$ is formed on a transparent glass substrate by sputtering.

Figure 5B:
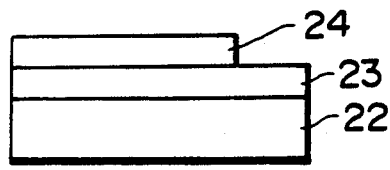

Then as shown in FIG. 5B, a first insulating layer 24 consisting of a tantalum oxide, oxide layer is formed on the transparent electrode 23 by sputtering.

Figure 5C:
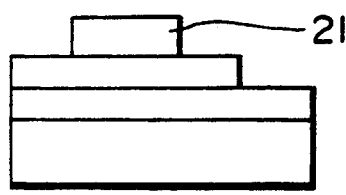

Then a vapor deposition apparatus as shown in FIG. 2 is used and Zn, S and Mn are put in discrete crucibles and the vacuum in the vacuum chamber is selected to be $10^{-5}$ Torr. Then their temperature of the three crucibles 12, 13, 14 are independently controlled to evaporate Zn, S and Mn such that the luminescent layer would have a stoichiometric structure while at the same time the temperature TS of the glass substrate 15 is selected to a suitable value in a range of 100°–1000° C. so as to form a luminescent layer 21 (see FIG. 5c) consisting of ZnS column polycrystals having a uniform distribution of the activator Mn.

Figure 5D:
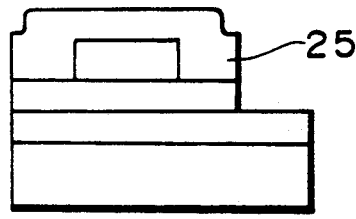

After that, as shown in FIG. 5d, a second insulating layer 25 consisting of tantalum oxide is formed on the luminescent layer 21 by sputtering.

Figure 5E:
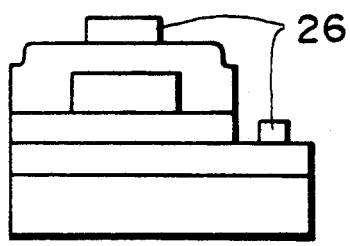

Finally as shown in FIG. 5e, back electrodes 26 are formed by forming an aluminum film by vacuum vapor deposition technique followed by patterning with lithophotoetching process.

Figure 6A:
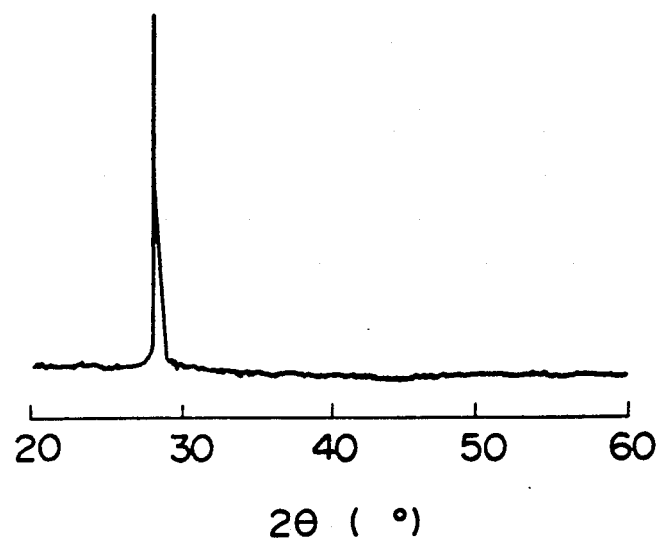
FIGS. 6a and 6b are graphs showing the result of X-ray diffraction of the luminescent layer of the film EL element of this invention and of the prior art element.
Figure 6B:
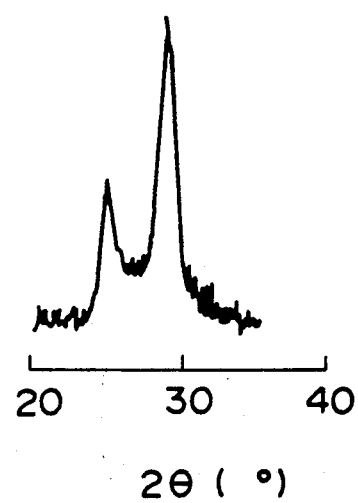

The luminescent layer of the thin film EL device has an excellent crystalline nature as evidenced by the result of X-ray diffraction shown in FIG. 6a. For comparison, the result of X-ray difraction of a ZnS:Mn layer formed by prior art electron beam vapor deposition method is shown in FIG. 6b. Comparison of the characteristics shown in FIGS. 6a and 6b shows that the luminescent layer formed by the method of this invention has better crystalline property.

Figure 7:
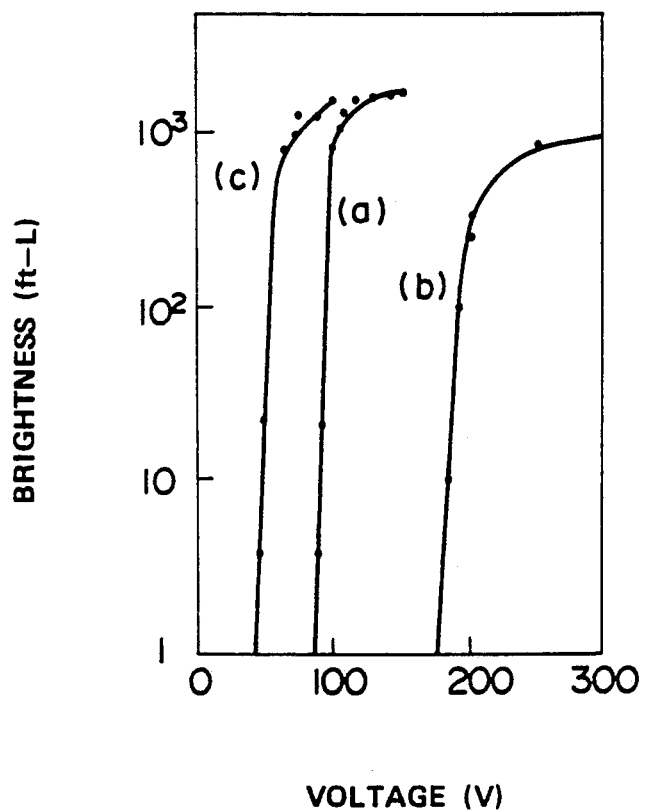
FIG. 7 is a graph for comparing the voltage - brightness characteristics of the thin film EL device of this invention and of the prior art.

The thin film EL device of this invention is driven by applying an AC electric field across the transparent electrode and the back electrode, and its voltage brightness characteristic a is shown in FIG. 7 together with that b of a prior art thin film EL device. Comparison of these characteristics shows that the thin film EL device of this invention to produce the same brightness with a voltage of about ½ of that required for the prior art thin film EL device. In other words, the element of this invention can produce a high brightness with low voltage.

Where an insulating film whose dielectric constant is much greater than that of the luminescent layer 21, for example, barium titanate $BaTiO_3$, is used for the first insulating layer 24 and the second insulating layer 25 the voltage-brightness characteristic is shown by a curve c in FIG. 7 showing that the element can be driven with a voltage of ⅓ or ¼ of the voltage necessary for the prior art thin film EL device, as shown by curve b in FIG. 7. Denoting the dielectric constants of the first and second dielectric layers 24 and 25 and at the luminescent layer 21 by $\epsilon r1$, $\epsilon r2$ and $\epsilon l$ respectively, the relation among these dielectric constants becomes $\epsilon r1$ $\epsilon r2 \gg \epsilon l$ (see FIG. 4). Consequently, the relation among their capacitances can be expressed by Cr1, Cr2 and Cl becomes Cr1, Cr2 $\gg$ Cl so that almost all voltage applied to the device from outside would be applied across the luminescent layer.

As above described with the thin EL element of this invention a low voltage of less than about 100 V is sufficient to obtain a brightness of about 20 ft-L (foot Lambert) which is valuable for practical use.

Although in the foregoing embodiment a ZnS: Mn film was used as the luminescent layer, it should be understood that the invention is not limited to such specific materials. For example, such other columnar polycrystals can be used as ZnS: 0.1-1 at. % $TbF_3$, ZnS: 0.1-1 at. % $SmF_3$ column polycrystals wherein ZnS is used as the host material and only the activator is substituted by terbium fluoride ($TbF_3$) or samarium fluoride ($SmF_3$) and such other column polycrystals as calcium sulfide (CaS): 0.1-1 at. % europium (Eu), strontium sulfide (SrS): 0.1-1 at. % cerium (Ce) can also be used.

In the foregoing embodiment, for the purpose of forming a column polycrystalline film of ZnS:Mn three crucibles respectively, controlling Zn, S and Mn were used as the sources of vapor deposition, any combination of ZnS, S, Mn; Zn, S, MnS and Zn, S, ZnS, Mn can be used.

Where such compound as $TbF_3$ is used as the activator, the constituting elements of the host material and the constituting elements of an activator and compound of the constituting elements Zn, S, Tb, $TbF_3$ can be put in independent crucibles so as to evaporate Zn, S, Tb and $TbF_3$ by independently controlling the temperatures of the crucibles such that host material and activator of the luminescent layer will have the stoichiometric composition and that the impurity concentration would have a predetermined value. At the same time, the substrate temperature is selected to a suitable value in a range of 100°-2000° C. (for the crucibles containing Tb and TbF$_3$, temperatures of 1000°-1100° C. are preferred). Then a luminescent layer consisting of ZnS column polycrystals having a uniform distribution of the activator TbF$_3$ can be formed. Preferably, the crucibles have a shutter that can be opened and closed.

With such method, it is possible to obtain a luminescent layer having constant and stable concentration distribution.

Furthermore, the thin film EL device can be driven by applying an alternating current electric field across the transparent electrode and the back electrode but it can produce the same brightness under a voltage of ½ of that of the prior art film EL. In other words, a higher brightness can be contained with lower voltage. Thus a green thin film EL device can be firstly obtained according to this invention.

By interposing a yttrium oxide (Y$_2$O$_3$) layer acting as a third insulating layer, having an intermediate refractive index between the first insulating layer 24 and the transparent electrode 23, the difference in the refractive index at the interface between the first insulating layer and the transparent electrode can be reduced and the reflection can also be reduced. Thereby enabling efficient deriving out the light emitted by the luminescent layer. Accordingly it is possible to further decrease the driving voltage.

The activator is not limited to TbF$_3$, and such other compounds as SmF$_3$, Sm$_2$S$_3$ and Tb$_2$S$_3$ can also be used. Further, other substances then ZnS can be used as the host material.

Although in the foregoing embodiment, for the purpose of preparing column polycrystalline film of ZnS:TbF$_3$, four crucibles respectively containing ZnS, Tb, and TbF$_3$ were used as the vapor deposition sources, four crucibles respectively containing Zn, Tb$_2$S$_3$, TbF$_3$ and S or Zn, Tb, ZnF and S can also be used.

Furthermore the thin film EL device of this invention can be used as a light source for display, illumination, writing, reading and erasing of signals into and out of light recording medium.

Figure 8:
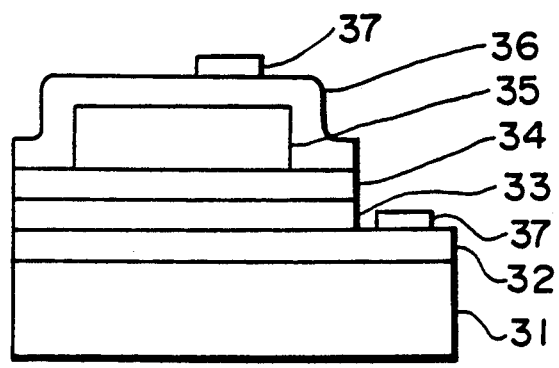
FIG. 8 is a side view showing a modified embodiment of this invention.

In another embodiment, shown in FIG. 8, the thin film EL device comprises a lamination of a transparent glass substances 31 having a thickness of 1 micron, a transparent electrode 32 made of tin oxide (SnO$_2$) having a thickness of 3 microns, a third insulating layer 33 made of yttrium oxide (Y$_2$O$_3$) having a thickness of 1.0 mm, a first insulating layer made of tantalum pentaoxide Ta$_2$O$_5$, having a thickness of 0.1 micron, a luminescent layer 35 made of zinc sulfide (ZnS): manganese (Mn) having a thickness of 0.5 micron, a second insulating layer 36 made of tantalum pentaoxide having a thickness of 0.5 micron and a back electrode made of an aluminum film having a thickness of 0.5 micron.

Figure 9:
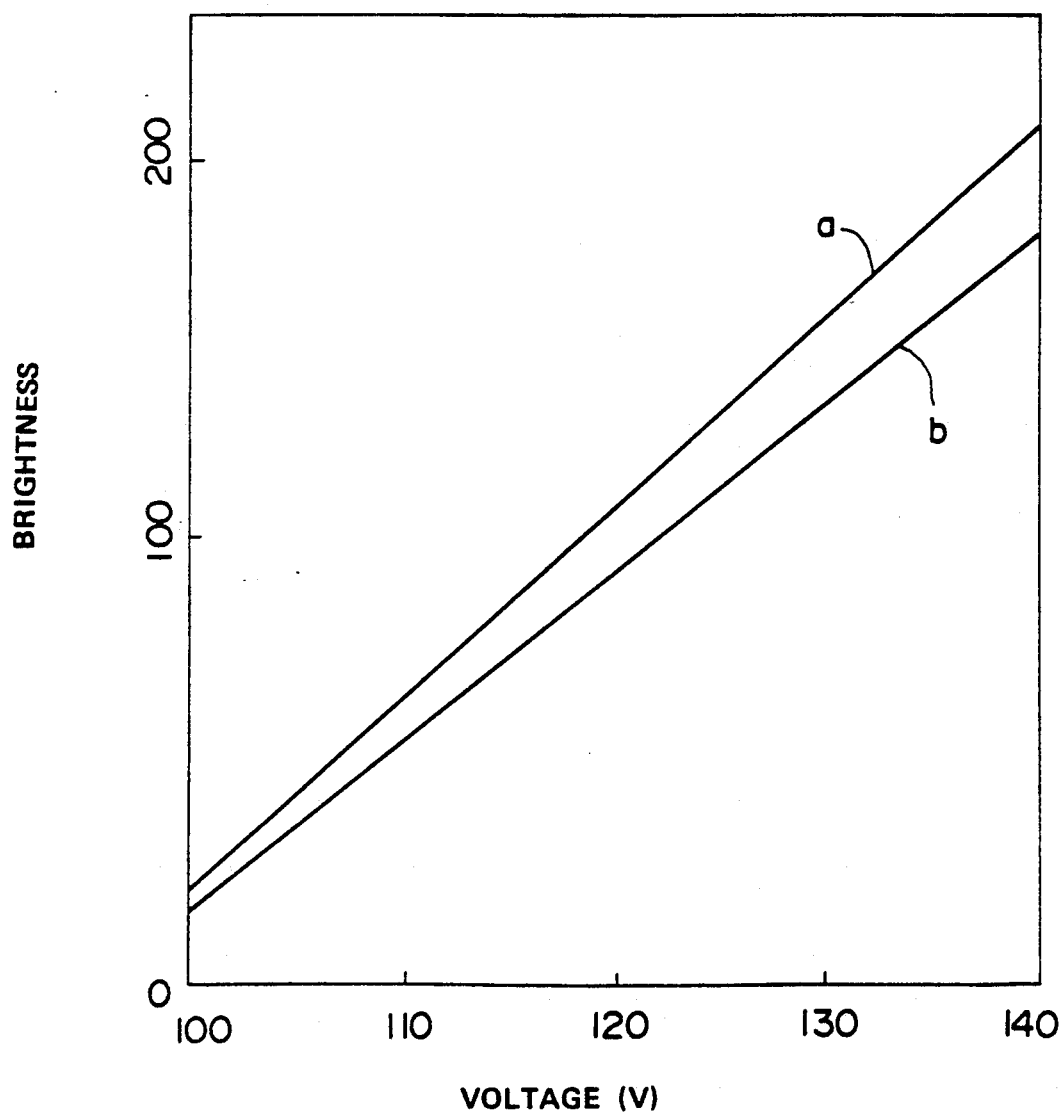
FIG. 9 is a graph for comparing the brightness voltage characteristics of the thin film EL device shown in FIG. 10 and a prior art thin film EL device.
Figure 10A:
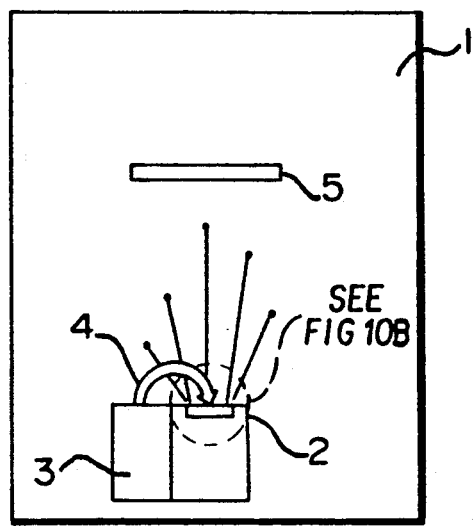
FIG. 10 shows the principle of the method of manufacturing the luminescent layer of the prior art thin film EL device.
Figure 10B:
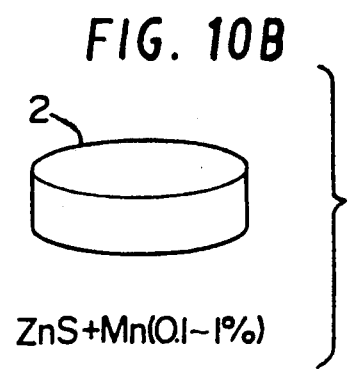
Figure 11:
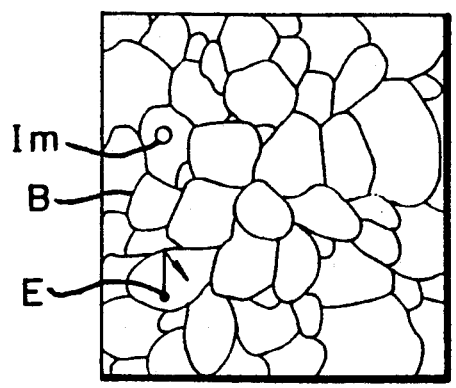
FIG. 11 shows the crystalline structure of the prior art luminescent layer.

This thin film EL device is driven by an AC electric field applied across the transparent electrode and the back electrode and its voltage-brightness characteristics a is shown in FIG. 9 together with that b of a prior art thin film EL device not provided with the third insulating layer. Comparison of these characteristics clearly shows that thin film EL device of this invention has large brightness than the prior art thin film EL device. In FIG. 9, the ordinate shows brightness and the abscissa the applied voltage in volt.

As above described, by interposing a third insulating layer, the difference in the refractive index at the interpose between the first insulating layer and the transparent electrode can be decreased without decreasing the dielectric constant of the first insulating layer whereby light reflection is decreased for efficiently deriving out the light emitted by the luminescent layer.

In the above described embodiment, the third insulating layer had a single layer construction, it may be constructed by multiple layers whose refractive indices are gradually increased from transparent electrode side to the second electrode side for gradually varying to refractive index.

It is also clear that materials for preparing various layers and films can be changed accordingly.

What is claimed is:

1. A method of manufacturing a thin film EL device on a substrate comprising the steps of:

forming a transparent electrode on said substrate;

forming a first insulating layer on said transparent electrode;

forming a luminescent layer having column polycrystals by a multi-source deposition method comprising steps of providing first elements constituting a host material of said luminescent layer evaporated from respectively separated evaporating sources, and a second element constituting an activator of said luminescent layer, and deposition said first and second elements in such a manner that said first elements are combined with each other and said second element is doped into said combined first elements on said first insulating layer;

forming a second insulating layer on said luminescent layer; and forming a back electrode on said second insulating layer.

2. The method according to claim 1, wherein said multi-source deposition method is performed in a vacuum of $10^{-3}$-$10^{-7}$ Torr.

3. The method according to claim 1, wherein a stoichiometric composition of said host material and a concentration of said activator in said host material are determined by independently controlling quantities of said first and second elements evaporated from said evaporating sources.

4. The method according to claim 1, wherein said second element is independently evaporated from a separate evaporating source.

* * * * *